United States Patent [19]

Yoshikawa et al.

[11] Patent Number: 4,748,844
[45] Date of Patent: Jun. 7, 1988

[54] DEVICE FOR MEASURING COMPONENTS OF FORCE AND MOMENT APPLIED TO VEHICLE TIRE

[75] Inventors: Hirotaka Yoshikawa, Kakogawa; Takeshi Yoshida, Tatsuno, both of Japan

[73] Assignee: Yamato Scale Company, Limited, Japan

[21] Appl. No.: 30,962

[22] Filed: Mar. 27, 1987

[30] Foreign Application Priority Data

May 9, 1986 [JP] Japan .................. 61-106963

[51] Int. Cl.$^4$ .................... G01L 5/16; G01M 17/02
[52] U.S. Cl. ......................... 73/146; 73/862.04
[58] Field of Search ............... 73/146, 862.04, 862.05, 73/862.06; 364/550, 551, 556, 559

[56] References Cited

U.S. PATENT DOCUMENTS

| 3,780,573 | 12/1973 | Reus ...................... 73/146 |
| 4,197,736 | 4/1980 | Barrett .................... 73/146 |
| 4,297,877 | 11/1981 | Stahl ...................... 73/146 |
| 4,448,083 | 5/1984 | Hayashi ................ 73/862.04 |

FOREIGN PATENT DOCUMENTS

60-38632 2/1985 Japan .

Primary Examiner—Donald O. Woodiel
Attorney, Agent, or Firm—Senniger, Powers, Leavitt and Roedel

[57] ABSTRACT

A device for measuring components of force and moment applied to a vehicle tire, which is generally used for automobile tire testing in co-operation with a multicomponent load cell structure fixed to a wheel shaft together with a tire to be tested to rotate therewith for picking up the component forces and moments as electric signals. The device includes an arithmetic unit adapted for sampling the data indicative of the component forces and moments and the datum indicative of the angle of rotation at a predetermined interval and storing the same for future use after transforming into the axial components belonging to an orthogonal coordinate system fixed to the body of vehicle. This device has such a unique advantage that the load cell structure can be attached directly to a real vehicle without any troublesome modification or re-construction in its parts such as wheel shaft, brake drum and likes, thereby enabling real vehicle driving test.

22 Claims, 6 Drawing Sheets

DEVICE FOR MEASURING COMPONENTS OF FORCE AND MOMENT APPLIED TO VEHICLE TIRE

BACKGROUND OF INVENTION

This invention relates to a device for measuring components of force and moment applied to a vehicle wheel shaft from a rotating tire and, more particularly, to a device for processing force and moment indicative signals supplied from a load cell structure rotating with the tire to obtain corresponding components about a predetermined co-ordinate fixed to the vehicle.

An example of a load cell structure used for this purpose is disclosed in U.S. Pat. No. 4,448,083. This prior art structure comprises a central hub portion, a circumferential rim portion and flexures formed between these portions to which are attached a plurality of strain sensing elements. The load cell structure is designed to be coupled to a vehicle to be tested by fixing the rim portion to the vehicle body and pivoting the hub portion through a bearing on a wheel shaft mounted with a tire. Therefore, it is rather easy to obtain the component forces and moments about a co-ordinate fixed to the vehicle by simply combining electric signals provided by the strain sensing elements as set forth in the above-cited U.S. patent. However, in order to mount a load cell structure of this type on a conventional automobile, it is necessary to prepare its mounting space by removing the brake drum, which may result not only in substantial danger in a high speed driving test, but also in significant difficulty in a steering or turning test.

Japanese patent opening gazette No. 60-38632 has proposed a load cell structure designed to be fixed to a wheel shaft to rotate with a tire. This structure also includes a central hub portion, a circumferential rim portion and strain sensing flexures formed between these portions, as in the prior art structure. In contrast, however, the hub portion is fixed directly to the wheel shaft and a tire is coupled to the rim portion through a modified tire rim as described later. With this type of load cell structure, therefore, it is unnecessary to remove the brake drum or to modify the vehicle in any way other than by using the modified tire rim. Consequently, it becomes possible to mount all wheel shafts with load cell structures and drive the vehicle freely and safely at a desired speed. In order to obtain the desired component forces and moments about a specific co-ordinate fixed to the vehicle as in the prior art device, the electric signals from the strain sensing elements, which may be derived, for example, through slip rings, must be suitably processed by arithmetic means. Such means is not disclosed in the above-cited reference.

SUMMARY OF INVENTION

Accordingly, an object of this invention is to provide novel and improved means for arithmetically processing such electric information signals supplied from respective strain sensing elements to provide six output signals indicative of the component forces and moments about three orthogonal axes of a specific co-ordinate fixed to the vehicle.

A device provided in accordance with a feature of this invention comprises means for deriving from a rotating multi-component force load cell fixed to a wheel shaft of a vehicle a set of electric signals indicative of components of applied force and moment about a co-ordinate fixed to the load cell, means for providing an electric signal indicative of the angle of rotation of the load cell, means for substantially simultaneously sampling both the component indicative signals and the angle indicative signal, and means for arithmetically processing the sampled signals to provide a set of signals indicative of corresponding components of the applied force and moment about a co-ordinate fixed to the vehicle.

These and other objects and features of this invention will be described in more detail below with reference to the accompanying drawings.

DESCRIPTION OF PREFERRED EMBODIMENT

Figure 1:
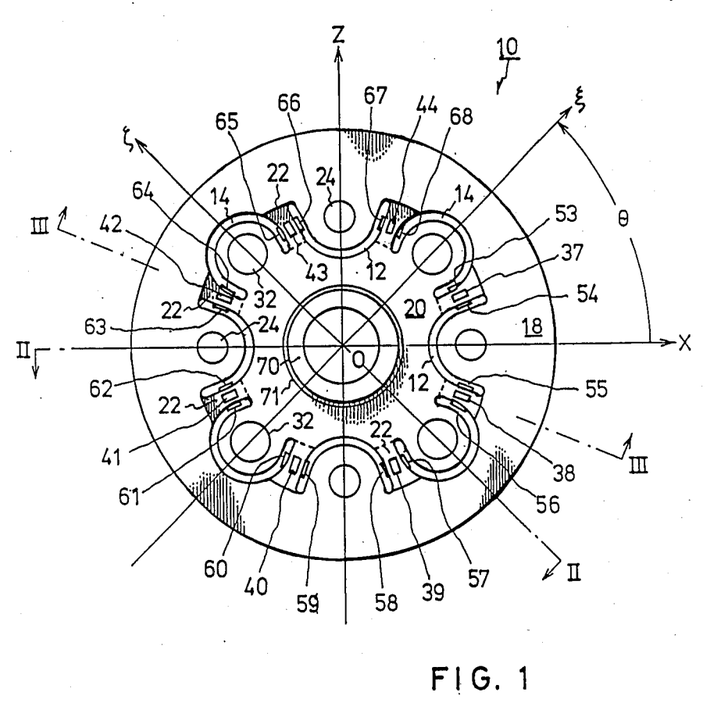
FIG. 1 is a plan view of a multi-component force measuring load cell structure used with the device of this invention.
Figure 2:
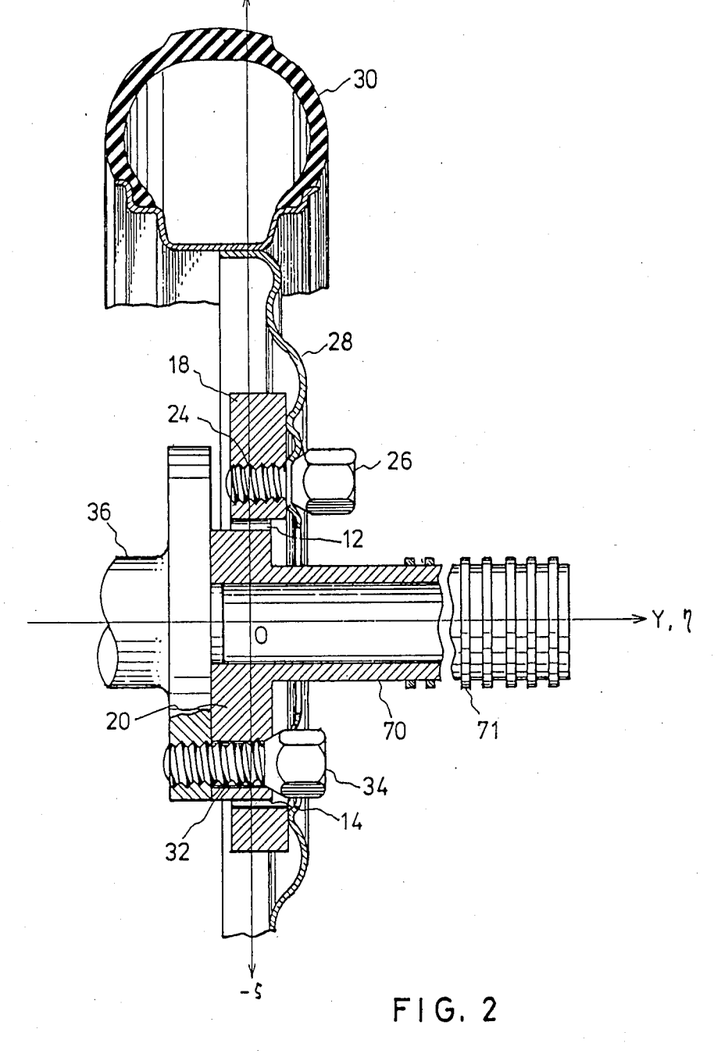
FIG. 2 is a sectional side view of the load cell structure taken along line II—II of FIG. 1 the device having an automobile tire mounted thereon.
Figure 3:
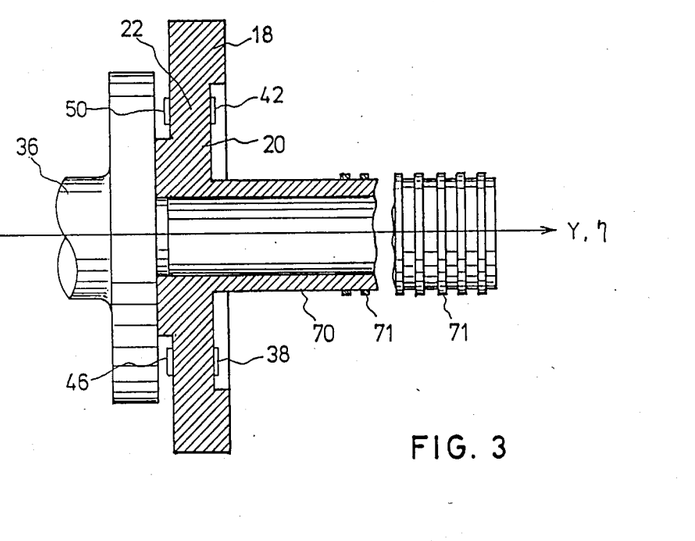
FIG. 3 is a sectional side view of the load cell structure taken along line III—III of FIG. 1.

FIGS. 1, 2 and 3 show a rotary six-component force load cell structure 10 used in an embodiment of this invention. The structure 10 is composed generally of a circular disc of elastic material having four U-shaped slots 12 arranged circularly at 90 degree intervals and four inverted U-shaped slots 14 also arranged circularly at 90 degree intervals between the slots 12. The annular peripheral portion outside these slots 12 and 14 forms a relatively thick "rim" portion 18 of the structure 10, and the central portion inside the slots 12 and 14 forms a relatively thick "hub" portion 20 of the structure. The remaining portion, namely, eight relatively narrow bridge portions between the legs of the slots 12 and 14 form relatively thin "flexure" portions 22. Four screw holes 24 are formed in the rim portion 18 for fixing thereto with bolts 26 a tire rim 28 mounted with an automobile tire 30 (FIG. 2). Four through holes 32 are formed in the hub portion 20 for fixing the hub 20 with bolts 34 to a wheel shaft or axle 36 of an automobile (not shown).

As shown in FIGS. 2 and 3, there is a relatively small axial step or offset between the rim and hub portions 18 and 20, the rim portion 18 being offset axially outwardly relative to the hub portion. This prevents the rim portion 18 and the flexures 22 from touching the wheel shaft 36 and also prevents the hub portion 20 and the flexures 22 from touching the tire rim 28.

Eight strain gauges 37, 38, 39, 40, 41, 42, 43 and 44 are affixed (e.g., adhered) to respective flexures 22 on their front or outer faces and eight corresponding strain gauges 45, 46, 47, 48, 49, 50, 51 and 52 are affixed to the flexures 22 on their back or inner faces, respectively. Sixteen strain gauges 53, 54, 55, 56, 57, 58, 59, 60, 61, 62, 63, 64, 65, 66, 67 and 68 are also affixed to respective flexures 22 on both side faces thereof as shown in FIG. 1. These strain gauges are preferably of the variable resistance type.

For convenience of the description, two orthogonal co-ordinate systems are used, namely, stationary and rotational co-ordinate systems. The stationary co-ordinate axes X, Y and Z are fixed with respect to the body of the vehicle and the rotational co-ordinate axes $\xi$, $\eta$ and $\zeta$ are fixed with respect to the load cell structure 10 to rotate with the wheel shaft 36. The axes Y and $\eta$ both coincide with the axis of rotation of the wheel shaft 36 and the load cell structure 10. The axes X and Z are fixed in horizontal and vertical directions, respectively, and the axes $\xi$ and $\zeta$ are fixed with respect to the load cell structure 10. The axes X, Z, $\xi$ and $\zeta$ all lie in a generally vertical plane passing midway between the front and back faces of the flexures 22, as shown in FIG. 2. In FIG. 1, $\xi$ and $\zeta$-axes are rotated with respect to the X and Z-axes by an angle $\theta$ which equals 45 degrees here.

Figure 4:
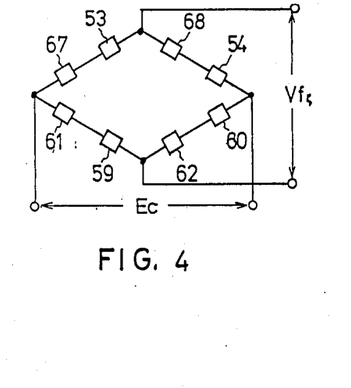
FIGS. 4 through 9 are schematic circuit diagrams in which strain sensing elements of the load cell structure of FIG. 1 are connected in bridge formation for providing electric signals indicative of six component forces and moments, respectively.
Figure 5:
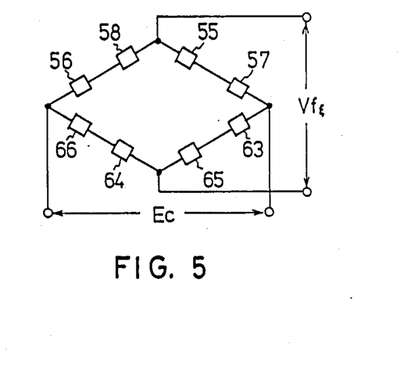
Figure 6:
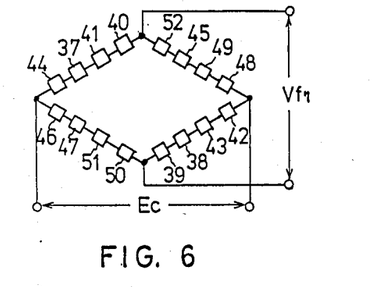
Figure 7:
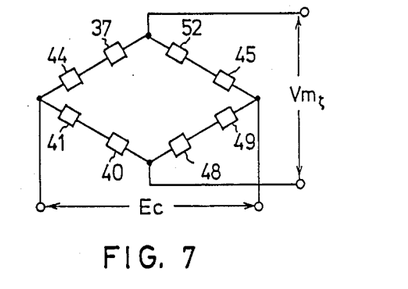
Figure 8:
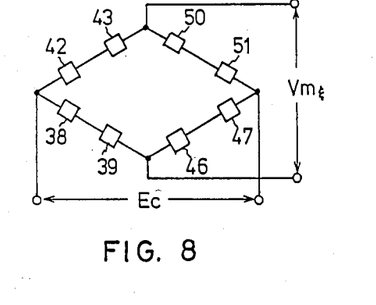
Figure 9:
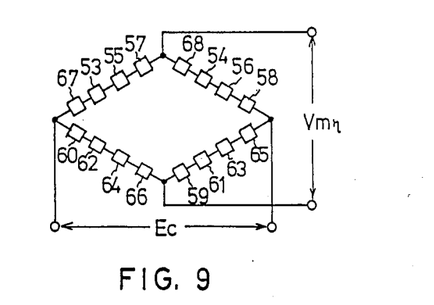

The strain gauges 37 through 68 are bridge connected as shown in FIGS. 4 through 9 for producing from a source voltage, Ec, electric signals $Vf_\xi$, $VF_\eta$ and $Vf_\zeta$ indicative of sensed component forces $f_\xi$, $f_\eta$ and $f_\zeta$ along $\xi$, $\eta$ and $\zeta$-axes, respectively, and electric signals $Vm_\xi$, $Vm_\eta$ and $Vm_\zeta$ indicative of component moments $m_\xi$, $m_\zeta$ about $\xi$, $\eta$ and $\zeta$-axes, respectively. Referring to FIGS. 1 and 4 for example, when the hub portion 20 is fixed and the rim portion 18 is urged in the direction of $\zeta$-axis (counterclockwise as viewed in FIG. 1), the strain gauges 53, 60, 62 and 67 will sense compression and the strain gauges 54, 59, 61 and 68 will sense tension. Accordingly, the bridge circuit of FIG. 4 will provide a voltage level $Vf_\zeta$ indicative of the $\zeta$-component of force, $f_\zeta$. Although the strain gauges 55, 56, 57, 58, 63, 64, 65 and 66 may sense compression or tension in this case, they are omitted from the circuit of FIG. 5 since they are negligibly small. No further description will be made about the other circuits of FIGS. 5 to 9 since they are self-explanatory from the above description of FIG. 4 and belong to the prior art. The output terminals of these bridge circuits are connected to slip rings 71 on a bobbin or hub 70 extending axially from the hub portion 20 for further processing the output signals $Vf_\xi$, $Vf_\eta$, $Vf_\zeta$, $Vm_\xi$, $Vm_\eta$ and $Vm_\zeta$ by the device of this invention as described below to obtain corresponding component forces Fx, Fy and Fz and component moments Mx, My and Mz along and about the X, Y and Z-axes, respectively.

Figure 10:
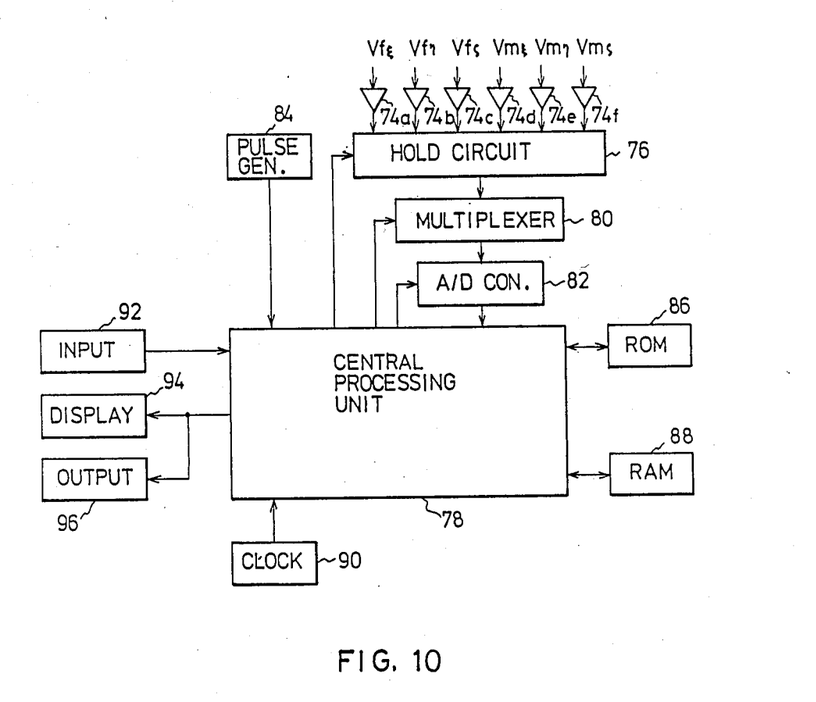
FIG. 10 is a block diagram representing an embodiment of the device according to this invention.

Referring to FIG. 10, the device of this invention includes a hold circuit 76 for receiving the abovementioned output signals $Vf_\xi$, $Vf_\eta$, $Vf_\zeta$, $Vm_\xi$, $Vm_\eta$ and $Vm_\zeta$ supplied from the bridge circuits of FIGS. 4 to 9 through amplifiers 74a, 74b, 74c, 74d, 74e and 74f, respectively, and holding them in response to a hold command supplied from a central processing unit (CPU) 78. These signals are then supplied to a multiplexer 80 which responds to a switching signal from the CPU 78 to sequentially supply the input signals to an analog-to-digital (A/D) convertor 82. The A/D convertor 82 responds to a command signal from the CPU 78 to convert the input signals into digital form and supplies them to the CPU 78.

The device further includes a pulse generator 84 interlocked with the wheel shaft for providing a train of pulses to the CPU 78 at intervals corresponding to every 0.1 degree of rotation, for example. Instead of the pulse generator 84, an angle generator (not shown) may be used for generating a signal indicative of the angle of rotation between X and $\xi$-axes in 0.1 degree units, for example. Each pulse signal from the pulse generator 84 is converted in CPU 78 into an angle signal indicative of the angle $\theta$ of rotation. The CPU 78 is further provided with a read-only memory (ROM) 86 and a random access memory (RAM) 88 for storing the output signals of A/D convertor 82 and the angle signal in the RAM 88 in accordance with a program stored in the ROM 86 or effecting an arithmetic operation such as exchanging data with RAM 88 and storing the result therein. The device also includes a clock generator 90 for generating a train of clock pulses used for executing an interrupt program as described in detail later, an input unit 92 for supplying signals to CPU 78 for specifying the start and end of measurement, a display unit 94 for displaying various data, and an output unit 96 for delivering the result of operation stored in RAM 88 to another computer or the like. Although the device also includes interface devices between CPU 78 and hold circuit 76, pulse generator 84 (or angle generator), clock generator 90, input unit 92, display unit 94 and output unit 96, they are neither shown nor described since they have no direct connection to the invention.

Figure 11:
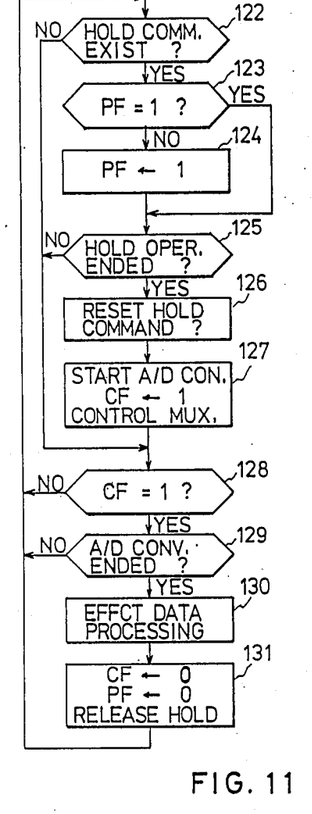
FIGS. 11 through 14 are flow charts illustrating an exemplary program for operating the device of FIG. 10.

Now, the operation of CPU 78 will be described with reference to the flow charts of FIGS. 11 to 14. The processing program shown in FIG. 11 is composed generally of two parts. In the first part, the hold circuit 76, multiplexer 80 and A/D convertor 82 are controlled to convert the signals from the respective bridge circuits of FIGS. 4 to 9 into digital signals. This conversion is effected in accordance with an interrupt program as shown in FIG. 14 at predetermined time or angle intervals. This program provides an angle signal indicative of the angle of rotation $\theta$ at predetermined time or angle intervals, for example, at one second or one degree intervals. In the second part of the processing program, the digital component force and moment signals and the angle signal are stored in RAM 88 or arithmetically operated on by CPU 78. The result of operation is stored in RAM 88. Two alternative modes may be used for the arithmetic operation. In the first mode, the component forces Fx, Fy and Fz and the component moments Mx, My and Mz are calculated using sines and cosines of the current angle of rotation at predetermined time or angle intervals and, in the second mode, the polarities of respective component signals are inverted at the angles of rotation equal to 90, 180 and 270 degrees, respectively. Accordingly, this processing program effects the six processes or modes listed below.

(1) The current component signals and the current angle signal are stored at predetermined time intervals.

(2) The current component signals and the current angle signal are stored at predetermined angle intervals.

(3) The desired component forces and moments are calculated at predetermined time intervals using the sine and cosine values of the current angle of rotation.

(4) The desired component forces and moments are calculated at predetermined angle intervals using the sine and cosine values of the current angle of rotation.

(5) The current component signals and the current angle signal are stored at 90, 180 or 360 degree intervals.

(6) The polarities of respective component signals are inverted in accordance with the current angle of rotation and the desired component forces and moments are calculated and stored at 90, 180 and 360 degree intervals.

One of these processing schedules is specified by a suitable instruction supplied previously from the input unit 92.

The interrupt program will be described first with reference to FIG. 14. The main processing program of FIG. 11 is interrupted and the interrupt program is executed in response to every clock pulse provided from the clock generator 90 and also to every angle pulse provided from pulse generator 84 (or every angle signal provided from the angle generator). Assume now, for example, that the clock pulse interval is 0.1 second, that the time is represented by a digital value representing the number of such units as 0.1 second, that the interval of angular pulses is 0.1 degree, and that, the angle of rotation is represented by a digital value representing the number of such units as 0.1 degree. It is further assumed that the input unit 92 provides inputs which indicate that samples of the angle of rotation at predetermined angle intervals.

It is inquired in the first step 101 whether the interruption is attributable to the clock pulse or not. If YES, it is further inquired in step 102 whether the angle data are sampled at predetermined time intervals or not. The answer is NO, since as assumed above the data are sampled at predetermined angle intervals. Therefore, it is further inquired in step 103 whether the interruption is attributable to the angle signal or not. This inquiry is complement of that of the first step 101 for double checking or failsafe purposes and the answer is NO in this case. Thus, the program returns to the main processing program.

In the case where the processing program was interrupted by the angle signal originating from the pulse generator 84 or angle generator (not shown), the answer in step 101 is NO and the answer in step 103 is YES. Therefore, it is inquired in step 104 whether the pulse generator is used or not. If the angle generator is used instead of the pulse generator, the answer is NO and the current angle of rotation provided by the angle generator is stored in a "C1-register" included in CPU 78. If the pulse generator 84 is used instead of the angle generator, the answer in step 104 is YES and the content of C1-register is incremented by one in step 106. Thereafter, it is inquired in step 107 whether the content of C1-register has exceeded 3600, that is, whether the wheel shaft has completed one rotation or not. If the answer is YES, the C1-register is reset to zero in step 108 and step 109 follows. The output of the pulse generator 84 is a train of pulses appearing at 0.1 degree intervals, while the output of the angle generator (not shown) is a digital signal indicative of the current angle of rotation which automatically returns to zero upon completion of each rotation. Steps 106 through 108 convert the angular pulses into angle indicative signals.

In the next step 109 which may follow step 105 107 or 108 as shown, it is again inquired whether the angle data are sampled at predetermined time interval or not. This inquiry is the same as that in step 102 and, therefore, the answer is NO for the same reason. It is further inquired in step 110 whether the content of C1-register is equal to that of C2-register or not. The C2-register stores a digital value indicative of the predetermined angle interval at which the desired data are to be sampled. If NO, the program is returned to the original processing program but, if YES, the next value is set in the C2-register in step 111. More particularly, the content of C2 is incremented by the value indicative of the predetermined angle interval. Thus, the content of C2-register increases every time as an integral multiple of the predetermined angle interval. It is inquired in the next step 112 whether a prcessing flag (PF) is "1" or not. The processing flag is a flag used for identifying the A/D convertor during the A/D conversion and it is set to "1" at the start of A/D conversion and reset to "0" at the end thereof as described later. If PF is "1" (YES), the program returns to the original program but, if PF is "0" (NO), the analog input signals $Vf_\xi$, $Vf_\eta$, $Vf_\zeta$, $Vm_\xi$, $Vm_\eta$ and $Vm_\zeta$ are held by the hold circuit 76 in step 113 and the content of C1-register is transferred to a C4-register for use in the CPU 78. Thus, the interrupt program ends and the processing program resumes. Consequently, the signals indicative of component forces and moments and the corresponding information indicative of the angle of rotation are sampled at predetermined, preset angle intervals in the C2-register.

Instead of the aforementioned assumption, it is now assumed that it has been previously instructed by the input unit 92 to sample the angle of rotation at predetermined time intervals. In this case, the answers in steps 102 and 109 are both YES. Therefore, the content of T1-register is incremented by one every time the clock pulse interrupts the program. As assumed above, this increment corresponds to 0.1 second. It is then inquired in step 116 whether the content of T1-register is exceeds the content of T2-register or not. The T2-register stores a digital value indicative of the predetermined time interval at which the desired data are to be sampled. When the content of T1-register becomes equal to that of T2-register, it is inquired in step 117 whether the processing flag is "1" or not. If YES, the T1-register is reset to zero in step 118 and the program returns to the main program but, if this flag is "0", the analog signals indicative of the component forces and moments are held by the hold circuit 76 in step 118 and the T1-register is reset to zero in step 119. If the flag is "1" in step 117, however, no holding action (step 118) takes place.

The steps 103 to 108 are executed similarly, and the answer in step 109 is YES in this case and it is inquired in step 120 whether the processing flag "1" or not. If not, the content indicative of the current angle of rotation is transferred to the C4-register in step 121. Otherwise, the program returns to the main program if the flag is "1" in step 120.

In the main processing program, as shown in FIG. 11, it is first inquired in step 122 whether the holding command of step 113 or 118 has been provided or not. If YES, it is further inquired in step 123 whether the processing flag is "1" or not. If NO, this flag is set to "1" in step 124 and it is inquired in step 125 whether the holding operation has ended or not. If YES, the holding command is reset in step 126 and A/D conversion is started, a conversion flag (CF) is set to "1" and the multiplexer 80 is controlled to supply the analog input signals sequentially from the hold circuit 76 to the A/D convertor 82 in step 127. The conversion flag is used for distinguishing that the A/D convertor 82 is effecting conversion by its logic "1" level. Then, it is inquired in step 128 whether the conversion flag is "1" or not and if YES, as in this case, it is further inquired in step 129 whether the converting operation has ended or not. If YES, a data processing operation is effected in step 130 and the conversion flag and processing flag are reset to "0" and the hold command is removed from the hold circuit 80 in step 131. Then, the program returns to the first step 122 to be similarly repeated. When the answer in step 123 is YES, step 125 follows and, when the answer in step 122 or 125 is NO, step 128 follows. When the answer of step 128 or 129 is NO, step 122 follows.

Figure 12:
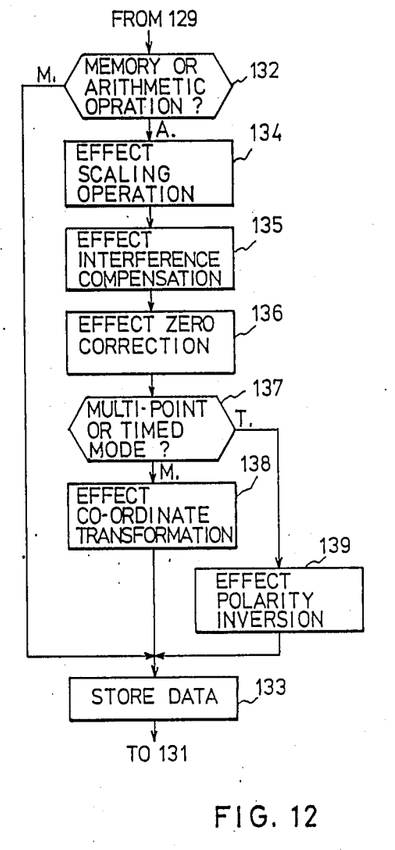

Referring next to FIG. 12 which represents a detailed embodiment of the abovementioned data processing step 130, it is first inquired in step 132 whether the "memory" or "arithmetic" operation has been specified by the input unit 92. If the memory operation has been specified, the current input signals of hold circuit 76 are A/D converted and in step 133 stored in RAM 88 together with the digital value of the current angle of rotation. There are three modes of this storing operation as aforementioned as items 1, 2 and 5. The mode to be used is specified by the input unit 92. The stored data are transferred from the output unit 96 to a separate processing device such as a computer (not shown) for further arithmetic operation.

If the answer in step 132 is "arithmetic", scaling, interference compensating and zero correcting operations are effected sequentially in steps 134, 135 and 136 as described in more detail later. Thereafter, it is inquired in step 137 whether the measurement is to be effected in the "multi-point" or "timed" mode. The multi-point mode of measurement means either mode of the aforementioned item 3 or 4, that is, the measurement effected at a constant interval of predetermined time or angle, while the timed mode of measurement means the mode of the aforementioned item 6, that is, the measurement effected at predetermined angles of rotation. If the multi-point measurement is specified, a co-ordinate transforming operation is effected in step 138 before the abovementioned storing step 133, as detailed later. If the timed measurement is specified, a polarity converting or inverting operation is effected in step 139 instead of step 138, as detailed also later.

In the scaling step 134, the digitized output signals of A/D convertor 82 indicative of the measured components $f_\xi$, $f_\eta$, $f_\zeta$, $m_\xi$, $m_\eta$ and $m_\zeta$ are multiplied respectively by predetermined scaling factors k1, k2, k3, k4, k5 and k6 to provide products $f_\xi'$, $f_\eta'$, $f_\zeta'$, $m_\xi'$, $m_\eta'$ and $m_\zeta'$ (where $f_\xi' = k1 \cdot f_\xi$, $f_\eta' = k2 \cdot f_\eta$, etc.). The factors k1, k2, k3, k4, k5 and k6 are determined respectively as quotients $f/f_\xi$, $f/f_\eta$, $f/f_\zeta$, $m/m_\xi$, $m/m_\eta$ and $m/m_\zeta$ where $f_\xi$, $f_\eta$ and $f_\zeta$ are output values of A/D convertor 82 when a force f is applied respectively along $\xi$, $\eta$ and $\zeta$-axes and $m_\xi$, $m_\eta$ and $m_\zeta$ are output values of A/D convertor 82 when a moment m is applied respectively about $\xi$, $\eta$ and $\zeta$-axes. As a result of this scaling operation, the analog values of respective components of force and moment can be displayed as they are by the display unit 94.

When a force is applied only along the $\xi$-axis and a moment is applied only about the $\xi$-axis, for example, it should be the case that only the components $f_\xi'$ and $m_\xi'$ appear and the other components do not appear. However, this is generally not the case and some of the other componets may appear due to mutual interference of these component forces and moments. The interference compensation in step 135 is effected to compensate for such interference errors. To this end, the following interference factors K11 through K66 are previously determined for $f_\xi'$, $f_\eta'$, $f_\zeta'$, $m_\xi'$, $m_\eta'$ and $m_\zeta'$ and stored in ROM 86.

TABLE

| $f_\xi'$ | $f_\eta'$ | $f_\zeta'$ | $m_\xi'$ | $m_\eta'$ | $m_\zeta'$ |
|---|---|---|---|---|---|
| K11 | K12 | K13 | K14 | K15 | K16 |
| K21 | K22 | K23 | K24 | K25 | K26 |
| K31 | K32 | K33 | K34 | K35 | K36 |
| K41 | K42 | K43 | K44 | K45 | K46 |
| K51 | K52 | K53 | K54 | K55 | K56 |
| K61 | K62 | K63 | K64 | K65 | K66 |

If the scaled values of respective components $f_\xi'$, $f_\eta'$, $f_\zeta'$, $m_\xi'$, $m_\eta'$ and $m_\zeta'$ are $+100$ kg, $+2$ kg, $-1$ kg, $+2$ kg-m, $-1$ kg-m and $+2$ kg-m, respectively, when a force of 100 kg is applied to the direction of $\xi$-axis, the factors K11, K21, K31, K41, K51 and K61 are determined as 1, 2/100, $-1/100$, 2/100, $-1/100$ and 2/100, respectively. The factors K12 through K62 and K13 through K63 are determined by applying a force along $\eta$ and $\zeta$-axes, respectively. The applied forces are desirably the same for all axes. The factors K14 through K64, K15 through K65 and K16 through K66 are determined similarly by applying moments about $\epsilon$, $\eta$ and $\zeta$-axes, respectively. These applied moments are also desirably the same.

Assuming $F_\xi$, $F_\eta$, $F_\zeta$, $M_\xi$, $M_\eta$ and $M_\zeta$ as interference-compensated values of $f_\xi'$, $f_\eta'$, $f_\zeta'$, $m_\xi'$, $m_\eta'$ and $m_\zeta'$, respectively, they are calculated by the following equations.

$$F_\xi = K11 \cdot f_\xi' - K12 \cdot f_\eta' -$$
$$K13 \cdot f_\zeta' - K14 \cdot m_\xi' - K15 \cdot m_\eta' - K16 \cdot m_\zeta'$$

$$F_\eta = -K21 \cdot f_\xi' + K22 \cdot f_\eta' -$$
$$K23 \cdot f_\zeta' - K24 \cdot m_\xi' - K25 \cdot m_\eta' - K26 \cdot m_\zeta'$$

$$F_\zeta = -K31 \cdot f_\xi' - K32 \cdot f_\eta' +$$
$$K33 \cdot f_\zeta' - K34 \cdot m_\xi' - K35 \cdot m_\eta' - K36 \cdot m_\zeta'$$

$$M_\xi = -K41 \cdot f_\xi' - K42 \cdot f_\eta' -$$
$$K43 \cdot f_\zeta' + K44 \cdot m_\xi' - K45 \cdot m_\eta' - K46 \cdot m_\zeta'$$

$$M_\eta = -K51 \cdot f_\xi' - K52 \cdot f_\eta' -$$
$$K53 \cdot f_\zeta' - K54 \cdot m_\xi' + K55 \cdot m_\eta' - K56 \cdot m_\zeta'$$

$$M_\zeta = -K61 \cdot f_\xi' - K62 \cdot f_\eta' -$$
$$K63 \cdot f_\zeta' - K64 \cdot m_\xi' - K65 \cdot m_\eta' + K66 \cdot m_\zeta'$$

When the tire 30 is put in contact with a road surface, the weight of tire is applied to the load cell structure 10 to provide corresponding output components from the respective bride circuits of FIGS. 4 to 9, thereby resulting in zero shift errors. The zero correction is effected for cancelling such errors. For this purpose, the abovementioned scaled and interference compensated values $F_\xi$, $F_\eta$, $F_\zeta$, $M_\xi$, $M_\eta$ and $M_\zeta$ are sampled at predetermined angle intervals $\theta$ while keeping the tire 30 apart from the road surface, and stored previously in ROM 116. The stored values are referred to as $F_{\xi\theta}$, $F_{\eta\theta}$, $F_{\zeta\theta}$, $M_{\xi\theta}$, $M_{\eta\theta}$ and $M_{\zeta\theta}$, respectively. In zero correction, the stored values are subtracted respectively from the current values of $F_\xi$, $F_\eta$, $F_\zeta$, $M_\xi$, $M_\eta$ and $M_\zeta$ to obtain zero-corrected values $F_\xi'$, $F_\eta'$, $F_\zeta'$, $M_\xi'$, $M_\eta'$ and $M_\zeta'$.

The co-ordinate transforming operation is effected in step 138 for converting the abovementioned zero-corrected values $F_\xi'$, $F_\eta'$, $F_\zeta'$, $M_\xi'$, $M_\eta'$ and $M_\zeta'$ belonging to the rotational co-ordinates $(\xi,\eta,\zeta)$ fixed to the load cell structure 10 into the values Fx, Fy, Fz, Mx, My and Mz belonging to the statinary co-ordinates (X,Y,Z) fixed to the automobile based upon the current value $\theta$ of the angle of rotation of the rotational co-ordinates with respect to the stationary co-ordinates. When the load cell structure 10 rotates in counter-clockwise direction as shown in FIG. 1, the transformation can be made by the following equations.

$$Fx = F_\xi' \cos\theta - F_\zeta' \sin\theta$$

$$Fz = F_\xi' \sin\theta + F_\zeta' \cos\theta$$

$$Mx = M_\xi' \cos\theta - M_\zeta' \sin\theta$$

$$Mz = M_\xi' \sin\theta + M_\zeta' \cos\theta$$

$$Fy = F_\eta', \; My = M_\eta'$$

When the rotation is clockwise, the following equations are used instead.

$$Fx = F_\xi' \cos\theta + F_\zeta' \sin\theta$$

$$Fz = -F_\xi' \sin\theta + F_\zeta' \cos\theta$$

$$Mx = M_\xi' \cos\theta + M_\zeta' \sin\theta$$

$$Mz = -M_\xi' \sin\theta + M_\zeta' \cos\theta$$

$$Fy = F_\eta', \; My = M_\eta'$$

Figure 15:
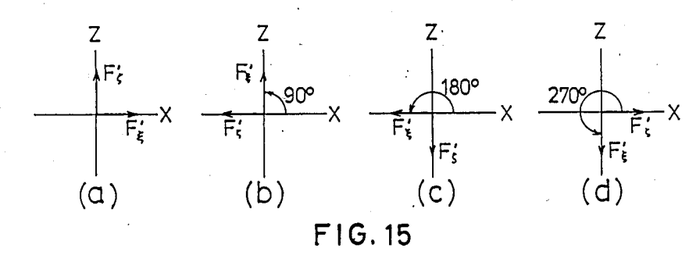
FIGS. 15(a) through 15(d) are diagrams representing states of rotation of the load cell structure of FIG. 1.

The polarity conversion or inversion in step 139 is used for calculating the values of Fx, Fy, Fz, Mx, My and Mz from $F_\xi'$, $F_\eta'$, $F_\zeta'$, $M_\xi'$, $M_\eta'$ and $M_\zeta'$ instead of the co-ordinate transformation. This operation is utilized when the component forces and moments are measured at 90 degree intervals. More particularly, Fx and Fz coincide respectively with $F_\xi'$ and $F_\zeta'$ when the angle of rotation is zero as shown in FIG. 15(a), with $-F_\zeta'$ and $F_\xi'$ when the angle of rotation is 90 degrees (FIG. 15(b)), with $-F_\xi'$ and $-F_\zeta'$ when the angle of rotation is 180 degrees and with $F_\zeta'$ (FIG. 15(c)) and $-F_\xi'$ when the angle of rotation is 270 degrees (FIG. 15(d)). The same relation is established for the components of moment.

Figure 13:
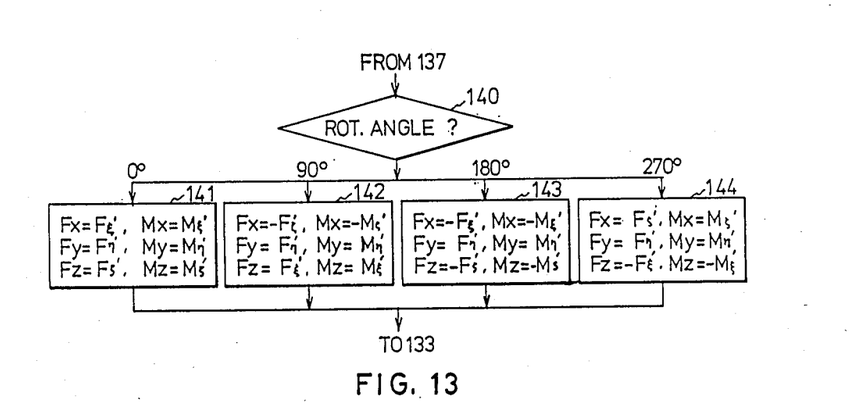
Figure 14:
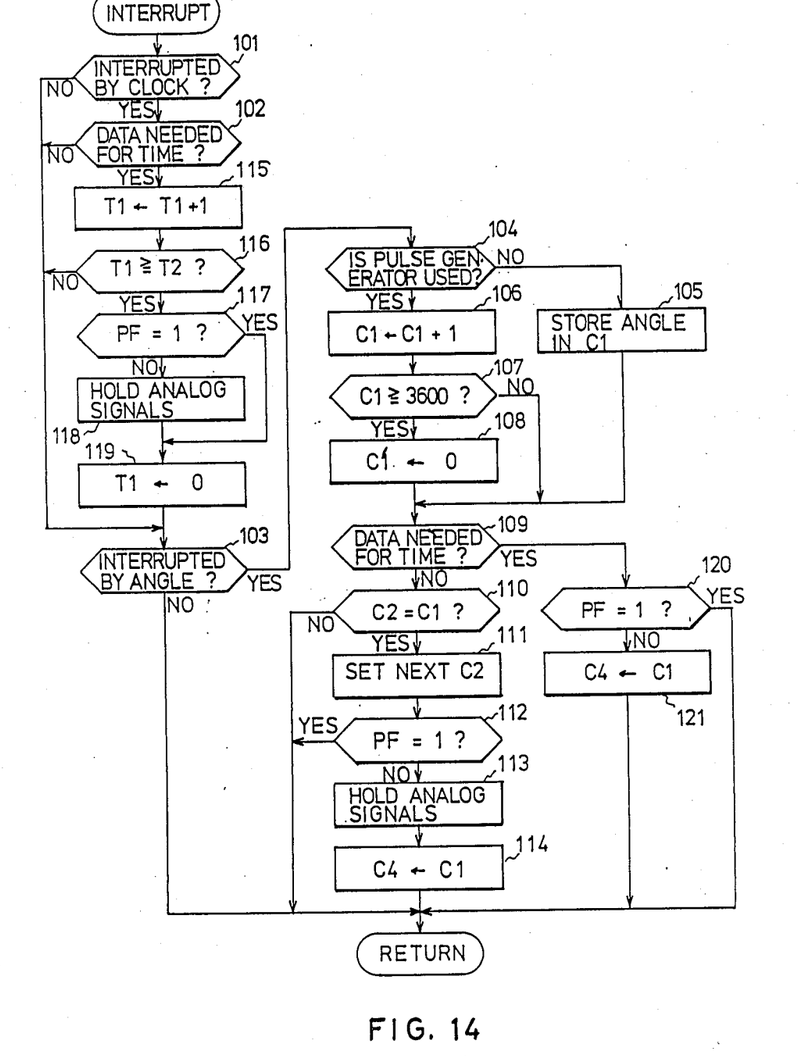

In a program of this polarity conversion operation, as shown in FIG. 13, it is first inquired in step 140 the angle of rotation at which the data are sampled. In accordance with the answer of this step, it is concluded that Fx, Fy, Fz, Mx, My and Mz are respectively equal to $F_\xi'$, $F_\eta'$, $F_\zeta'$, $M_\xi'$, $M_\eta'$ and $M_\zeta'$ at zero degree (step 141), to $-F_\zeta'$, $F_\eta'$, $F_\xi'$, $-M_\zeta'$, $M_\eta'$ and $M_\xi'$ at 90 degrees (step 142), to $-F_\xi'$, $F_\eta'$, $-F_\zeta'$, $-M_\xi'$, $M_\eta'$ and $-M_\zeta'$ at 180 degrees (step 143) and to $F_\zeta'$, $F_\eta'$, $-F_\xi'$, $M_\zeta'$, $M_\eta'$ and $-M_\xi'$ (step 144). When the rotation is clockwise, steps 142 and 144 are interchanged.

Instead of 90 degree intervals, the data may be sampled at 180 or 360 degree intervals. In case of 360 degree intervals, both the co-ordinates always coincide and all the corresponding component forces and moments are mutually equal.

It should be noted that the invention is not limited to the above description and various modifications and changes can be made within the scope of invention as set forth in the appended claims. For example, the interference compensation may be omitted if no interference occurs in the specific load cell 10 in use. The interference compensation may be effected after the zero correction, though the operation factors should differ from those as described above. The scaling operation may be effected before step 132, or alternatively this operation may be omitted from the program if it is effected before the amplifiers 74.

We claim:

1. A device for measuring components of force and/or moment applied to a vehicle tire to be tested, in co-operation with a multi-component load cell structure fixed to a wheel shaft of a vehicle together with said tire to be tested to rotate therewith for producing first electric signals indicative of respective components of said force and/or moment and a second signal indicative of the angle of rotation of said wheel shaft; comprising means for sampling said first signals and said second signal as a set substantially at the same time, and means for storing said sampled set of first and second signals.

2. A device according to claim 1, characterized in that said sampling and storing operations are effected repeatedly.

3. A device for measuring components of force and/or moment applied to a vehicle tire to be tested, in co-operation with a multi-component load cell structure fixed to a wheel shaft of a vehicle together with said tire to be tested to rotate therewith for producing first electric signals indicative of axial components of said force and/or moment belonging to a rotational co-ordinate system fixed to said wheel shaft and a second electric signal indicative of the angle of rotation of said wheel shaft with respect to a stationary co-ordinate system fixed to the body of said vehicle: characterized in that said device comprises means for sampling said first signals and said second signal as a set substantially at the same time, arithmetic means for processing said sampled set of first and second signals to produce an output, and means for storing the output of said arithmetic means.

4. A device according to claim 3, characterized in that said processing and storing operations are effected repeatedly.

5. A device according to claim 3 or 4, characterized in that said arithmetic means comprises zero correction means for subtracting from said first signals of said sampled set previously stored signals indicative of no-load initial values of said components at the angle of rotation specified by said second signal to obtain corresponding net values of said components, and means for converting two mutually orthogonal components of force or moment of said net values which are normal to the axis of rotation of said wheel shaft into horizontal and vertical components of force or moment which are normal to said axis of rotation and belong to said stationary co-ordinate system in accordance with said second signal.

6. A device according to claim 5, characterized in that said converting means includes means for changing the co-ordinate axes and the polarities of said two orthogonal net components in accordance with said second signal.

7. A device according to claim 3 or 4, characterized in that said arithmetic means comprises means for compensating for mutual interference of said first signals in said sampled set, zero correction means for subtracting previously stored signals indicative of no-load initial values of said components at the angle of rotation specified by said second signal from said compensated first signals to obtain corresponding net values of said components, and means for converting two mutually orthogonal components of force or moment of said net components which are normal to the axis of rotation of said wheel shaft into horizontal and vertical components of force or moment which are normal to said axis of rotation and belonging to said stationary co-ordinate system in accordance with said second signal.

8. A device according to claim 7, characterized in that said converting means includes means for changing the co-ordinate axes and the polarities of said two orthogonal net components in accordance with said second signal.

9. A device according to claim 3 or 4, characterized in that said arithmetic means comprises zero correction means for subtracting previously stored signals indicative of no-load initial values of said components at the angle of rotation specified by said second signal from said first signals of said sampled set to obtain corresponding net values of said components, means for compensating for mutual interference of said net components, and means for converting two mutually orthogonal components of force or moment of said compensated net components which are normal to the axis of rotation of said wheel shaft into horizontal and vertical components of force or moment which are normal to said axis of rotation and belong to said stationary co-ordinate system in accordance with said second signal.

10. A device according to claim 9, characterized in that said converting means includes means for changing the co-ordinate axes and the polarities of said two orthogonal compensated net components in accordance with said second signal.

11. A device for measuring components of force and/or moment applied to a shaft by a rotating member rotating on the shaft, the device comprising:
means for producing first signals representative of components of said force and/or moment relative to a co-ordinate system which rotates with the rotating member;
means for producing second signals representative of the angular position of the rotating member relative to a co-ordinate system which is stationary with respect to the shaft;
processing means for generating at least one command signal in response to a selected second signal; and
means responsive to said command signal for sampling and holding the first signals produced at the angular position of the rotating member corresponding to said selected second signal;
said processing means being operable to process said sampled and held first signals and corresponding second signal and to store them as a set.

12. A device according to claim 11 wherein said processing means repeatedly generates command signals and stores sets of the sampled and held first signals and corresponding second signals.

13. A device according to claim 11 wherein the processing means includes zero correction means for subtracting from the stored signals previously stored signals indicative of no-load initial component values at the angle specified by the corresponding speed signal to obtain corresponding net values of said components, and means for converting said net values into horizontal and vertical components of force or moment relative to said stationary co-ordinate system.

14. A device according to claim 13 wherein said converting means includes means responsive to preselected second signals for effecting polarity conversion to change the net values of said components into component values with respect to the stationary co-ordinate axes.

15. A device according to claim 14 wherein said preselected second signals are produced at about ninety degree intervals of rotation of the rotating member.

16. A device according to claim 13 wherein said processing means includes means for adjusting the stored signals to compensate for mutual interference between components of said force and/or moment.

17. A device according to claim 16 wherein said converting means includes means responsive to preselected second signals for effecting polarity conversion to change the net values of said components into component values with respect to the stationary co-ordinate axes.

18. A device according to claim 16 wherein said processing means includes means for storing a table of interference factors and for applying the interference factors to the stored signals to produce interference compensated values.

19. A device according to claim 11 wherein the processing means includes zero correction means for subtracting from the stored first signals previously stored signals indicative of no-load initial component values at the angle specified by the corresponding second signal to obtain corresponding net values of said components, means for adjusting the net values to compensate for mutual interference between components of said force and/or moment and means for converting said net values into horizontal and vertical components of force or moment relative to said stationary co-ordinate system.

20. A device according to claim 19 wherein said processing means includes means for storing a table of interference factors and for applying the interference factors to the stored first signals to produce interference compensated values.

21. A device according to claim 19 wherein said converting means includes means responsive to preselected second signals for effecting polarity conversion to change the net values of said components into component values with respect to the stationary co-ordinate axes.

22. A device according to claim 21 wherein said preselected second signals are produced at about ninety degree intervals of rotation of the rotating member.

* * * * *